(12) United States Patent
Grainger

(10) Patent No.: US 8,801,024 B2
(45) Date of Patent: Aug. 12, 2014

(54) EXTENSION HANDLE FOR CHILDREN'S MECHANICAL, WHEELED VEHICLES

(71) Applicant: Holly J. Grainger, London (GB)

(72) Inventor: Holly J. Grainger, London (GB)

( * ) Notice: Subject to any disclaimer, the term of this patent is extended or adjusted under 35 U.S.C. 154(b) by 0 days.

(21) Appl. No.: 13/906,718

(22) Filed: May 31, 2013

(65) Prior Publication Data
US 2013/0320643 A1 Dec. 5, 2013

(30) Foreign Application Priority Data
Jun. 1, 2012 (GB) .................................... 1209774

(51) Int. Cl.
*B62K 9/00* (2006.01)
(52) U.S. Cl.
USPC .......................................... 280/293; 280/292
(58) Field of Classification Search
None
See application file for complete search history.

(56) References Cited

U.S. PATENT DOCUMENTS

| | | | |
|---|---|---|---|
| 5,395,130 A | 3/1995 | Rubin | |
| 5,564,726 A | 10/1996 | Hearn et al. | |
| 6,149,178 A * | 11/2000 | Bradbury et al. | ............ 280/293 |
| 6,398,248 B1 | 6/2002 | Dodson | |
| 2005/0057012 A1 | 3/2005 | Boyle et al. | |

FOREIGN PATENT DOCUMENTS

| | | |
|---|---|---|
| DE | 9402603 | 5/1994 |
| GB | 2381782 | 5/2003 |
| GB | 2444556 | 6/2008 |

OTHER PUBLICATIONS

Great Britain Search Report; Application No. GB1209774.7; Date of Search: May 20, 2013.

* cited by examiner

*Primary Examiner* — John Walters
*Assistant Examiner* — James Triggs
(74) *Attorney, Agent, or Firm* — Fay Sharpe LLP

(57) ABSTRACT

An extension or towing handle for use with a child's scooter or other children's mechanical, wheeled vehicles, with a rigid, extension handle that affixes to the horizontal handlebar of the children's mechanical, wheeled vehicle by a clamshell-shaped plastic moulding, a metal bracket and various nuts and bolts, or by U-shaped bolts, a bracket and a back plate, or by a bracket. The handle may alternatively be somewhat flexible rather than entirely rigid, and may be telescopic. The handle pivots for a wide, vertical range of motion, to enable comfortable towing by an accompanying adult when in a raised position, as well as stowing in a lowered position when not in use. The handle has little or no horizontal range of motion, so that the accompanying adult may help the child to steer, and may include a finial allowing the user to grip it firmly and comfortably.

18 Claims, 10 Drawing Sheets

EXTENSION HANDLE FOR CHILDREN'S MECHANICAL, WHEELED VEHICLES

The application claims priority to and the benefit of UK patent application GB 1209774.7, filed Jun. 1, 2012 and entitled "EXTENSION HANDLE FOR CHILDREN'S MECHANICAL, WHEELED VEHICLES", the entirety of which is hereby incorporated by reference.

This invention relates to an extension handle for children's mechanical, wheeled vehicles such as scooters, tricycles, balance bikes and bicycles. It will mostly be used to tow the mechanical, wheeled vehicle, although in certain other configurations, the handle could be used to push the vehicle instead. It will be especially useful for towing children on their scooters.

When young children first learn to use a scooter they tire easily and lack confidence. After a short while they invariably need to be towed. This involves the accompanying adult leaning down to hold the scooter handlebar, whilst walking along, which leads to back and shoulder pain for the adult.

One solution is to tie string or a scarf to the handlebar, although this is unsafe when stopping, for example at a road junction, since the scooter and child continue their forward motion after the accompanying adult has stopped.

To overcome this, the present invention proposes a rigid extension handle, fixed onto the child's scooter.

According to an aspect of the present invention, this towing handle for children's mechanical, wheeled vehicles (such as scooters, tricycles, balance bikes or bicycles) comprises a rigid, extension handle. The handle affixes to the horizontal handlebar of the children's mechanical, wheeled vehicle by means of a clamshell-shaped plastic moulding, a metal bracket and various nuts and bolts. Alternatively it may be affixed by means of U-shaped bolts, a bracket and a back plate. Alternatively, the handle may be affixed to the vertical shaft of the children's mechanical, wheeled vehicle, by means of a bracket. The handle may alternatively be somewhat flexible rather than entirely rigid. The handle may be telescopic. The handle pivots for a wide, vertical range of motion, to enable comfortable towing by the accompanying adult when in the raised position, as well as stowing in the lowered position when not in use. It has little or no horizontal range of motion, so that the accompanying adult may help the child to steer. It has a finial allowing the user to grip it firmly and comfortably.

The handle may be used for children's mechanical, wheeled vehicles, such as scooters, tricycles, balance bikes or bicycles. It is suitable for all children's 2- or 3-wheeled scooters, although has been designed specifically for the bestselling Mini Micro scooter.

The handle enables the adult to tow the child and scooter in a controlled way without excessive bending, thus greatly reducing backache.

Being rigid, the child and scooter will stop at the same time as the accompanying adult, thus greatly increasing safety. It will be especially useful when helping children to cross the road on their scooters. The invention will also enable the accompanying adult to push an infant in a buggy or pram at the same time as helping the child to scoot, even at an early age. This should help to reduce unnecessary car journeys to nursery or school.

The handle can be lowered when not in use and may be stowed by being clipped onto the vertical part of the scooter. This may be achieved by means of detents on the inside of the plastic clamshell. Alternatively it could be achieved by a separate retaining clip.

The invention is illustrated by means of the following drawings, in which.

DESCRIPTION OF PREFERRED EMBODIMENTS

Figure 1:
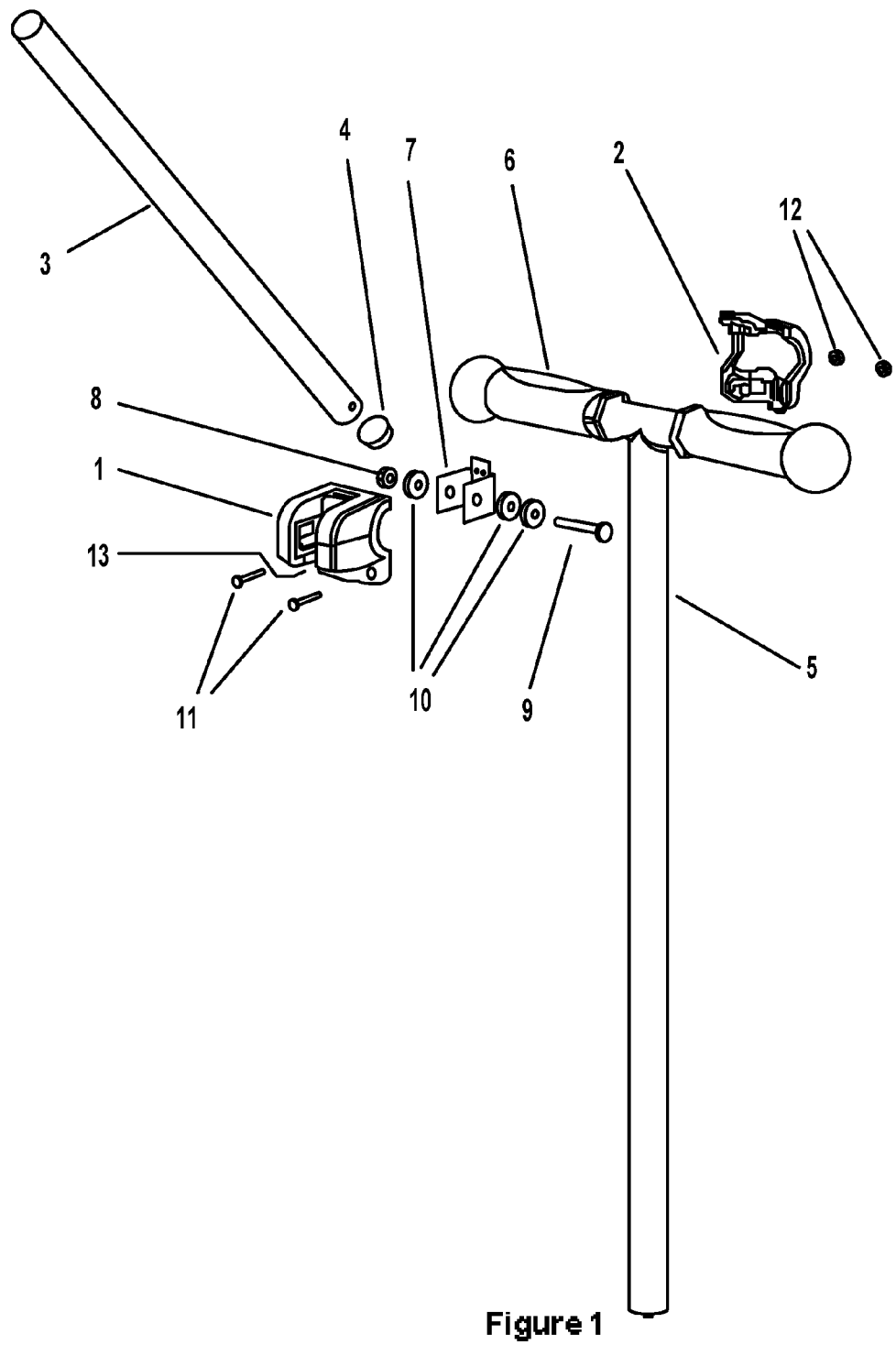
FIG. 1 show the handle in the preferred embodiment, attached to the scooter by means of a clamshell-shaped plastic moulding, a metal bracket and various nuts and bolts.

FIG. 1 illustrates a preferred embodiment. It shows a towing handle 3 with the front and rear portions of a clamshell-shaped plastic moulding 1, 2, which hinge together at the top and when clamped shut, to affix the towing handle 3 to the T-shaped portion of the scooter 5. The towing handle 3 is attached to the front clamshell-shaped portion 1 and by firstly pivotally securing a metal bracket 7 by means of the nut 8, bolt 9 and washers 10. The metal bracket 7 is then heat staked into the front portion of the clamshell-shaped plastic moulding 1.

The complete unit thus formed, from the front portion of the clamshell-shaped 1, now with the towing handle attached and the rear portion clam-shell plastic moulding 2 are clamped around the consumer's scooter 5, by hinging together over a suitable circular shaped section of the scooter. In this embodiment the clam-shell are fitted over the rubber handgrips on the horizontal part of the T-shaped top part of the steering column of a scooter 6. The unit is then fastened in place by the user by means of the two hex head bolts 11, which connect with the two nyloc nuts 12 inside the rear portion of the clamshell-shaped plastic moulding 2.

Figure 3:
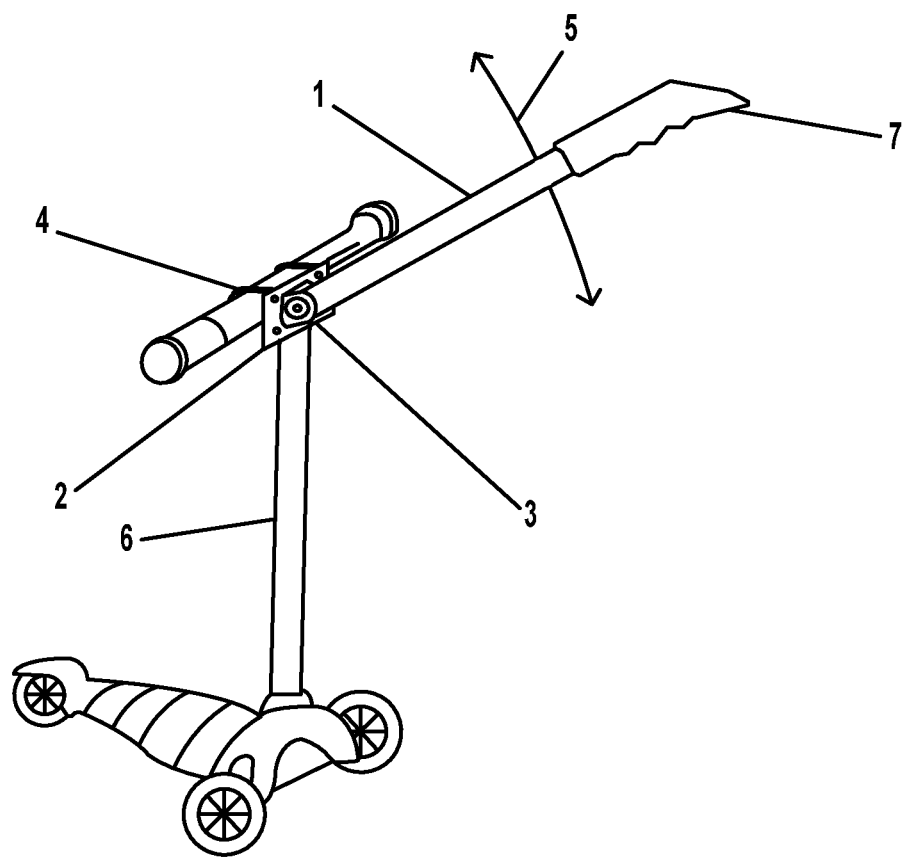
FIG. 3 shows the handle in the first alternative embodiment, attached to the scooter by means of a plate and U-bolts.

The handle 3 has a protective endcap 4. The handle is finished with an ergonomically-shaped finial as shown in FIG. 3. The handle has a vertical field of motion enabling it to be raised for towing and subsequently lowered when not in use. In the preferred embodiment the handle can be securely stowed when not in use by means of the detents 13 on either side of the base of the aperture at the front of the front portion of the clamshell-shaped plastic moulding 1. These detents 13 will allow the handle shaft 3 to be released or stowed by giving a sharp tug or push respectively. There are also nodules on either side of the top section of the front portion of the clamshell-shaped plastic moulding 1 (not illustrated) which will prevent the handle from passing beyond the vertical, in order to prevent injury to the child.

The preferred embodiment uses hex head bolts in order that the consumer can affix the device using only an allen key. Any other suitable nut arrangement could be used, for example wing nuts or cross-head screws.

Any other suitable washer arrangement could be used, with any number and combination of plain or notched washers.

Figure 2:
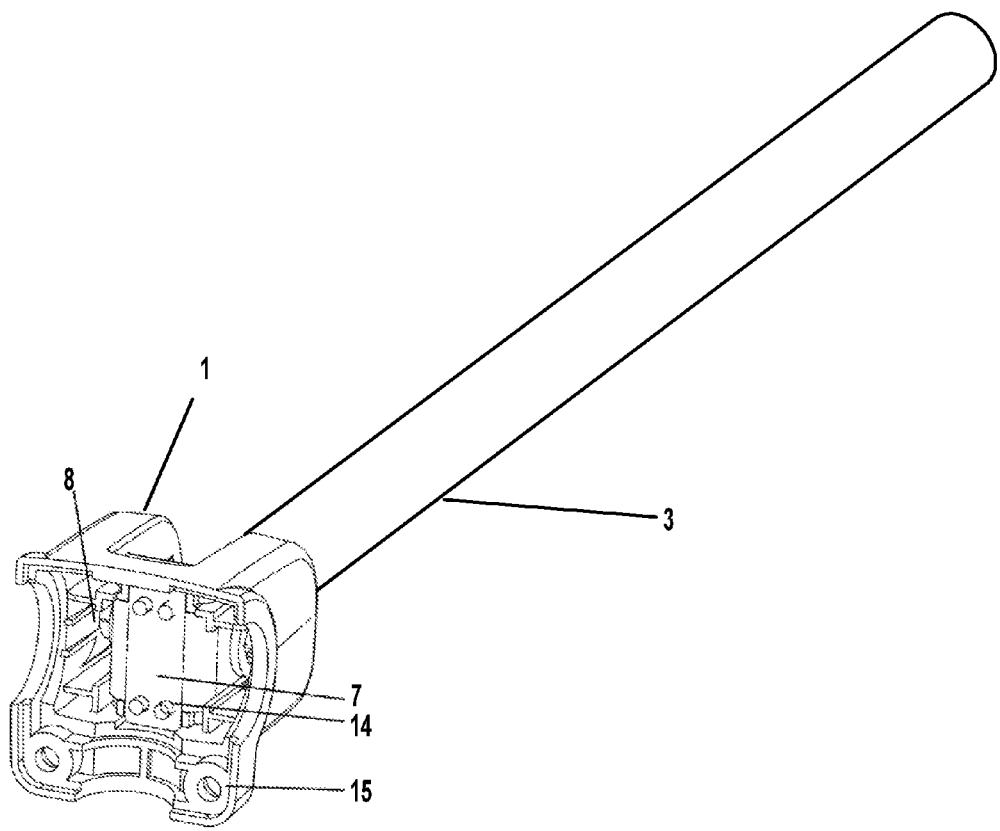
FIG. 2 shows the interior of the front section of the clamshell-shaped plastic moulding.

FIG. 2 illustrates a rear view of the front portion of the clamshell-shaped plastic moulding 1 in the preferred embodiment. It can be seen that the metal handle 3 has been affixed by means of a nut 8 onto the metal bracket 7. This metalwork is then heat staked onto the front portion of the clamshell-shaped plastic moulding 1 by means of the plastic bosses 14. There are holes 15 to accommodate the hex head screws 11 which attach the front and rear portions of the clamshell-shaped plastic moulding 1 and 2 together.

DESCRIPTION OF ALTERNATIVE EMBODIMENTS

FIG. 3 illustrates a first alternative embodiment. It shows the handle 1, which is attached to the scooter 6 by means of a back plate 2 and bracket 3 which are welded together. The back plate 2 is attached to the horizontal part of the scooter with 2 U-shaped bolts 4. The handle is finished with an ergonomically-shaped finial 7. The handle has a vertical field of motion enabling it to be raised for towing and subsequently lowered when not in use, as indicated by the arrows 5. It is envisaged that the handle 1, back-plate 2, bracket 3 and finial 7 are delivered ready-assembled. The only part requiring assembly by the consumer is to attach the U-shaped bolts 4 onto the user's scooter.

Figure 4:
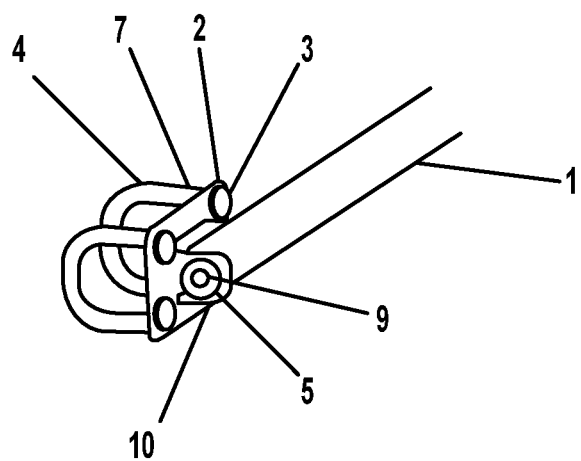
FIG. 4 shows a detailed view of the means by which the handle attaches to the scooter, in a first alternative embodiment.

FIG. 4 shows in more detail how the U-bolts 4 are threaded 7 so as to enable the section comprising the plate 2, the bracket 10 and the handle 1 to be attached with domed nuts 3. It also shows further detail of how the bracket 10 is welded onto the back-plate 2 and how the handle 1 is affixed to the bracket by means of a dome nut 9 and protective washer 5.

Figure 5:
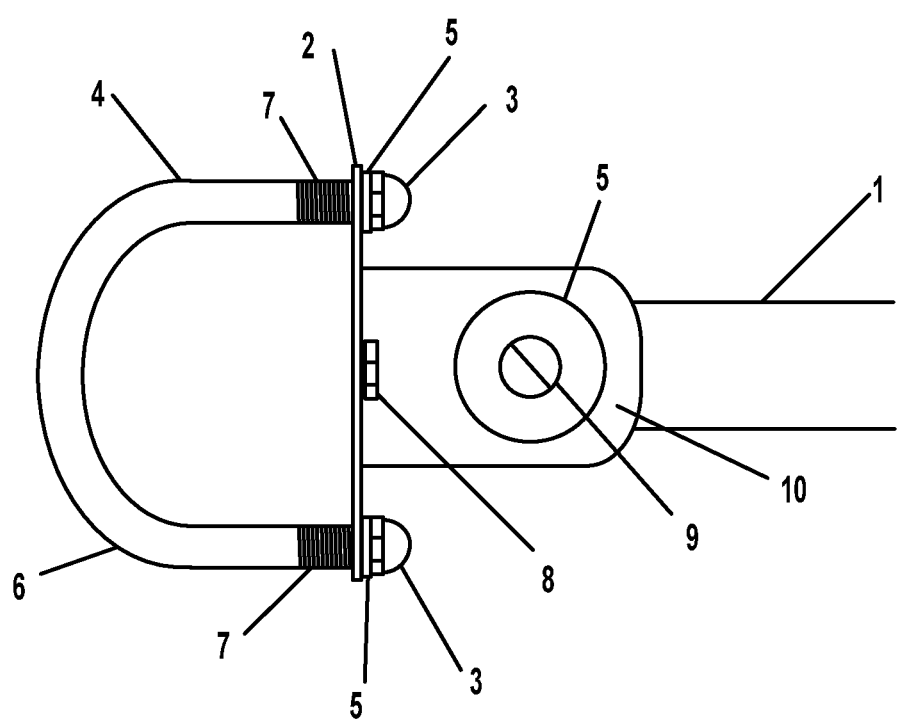
FIG. 5 shows a detailed, side view of a first alternative embodiment.

This arrangement is shown in a detailed side view in FIG. 5. It can be seen that the handle 1 is attached to the bracket 10 by means of the dome nut 9 and protective washers 5. Any other suitable nut arrangement could be used, for example wing nuts or cross-head screws. Any other suitable washer arrangement could be used, with any number and combination of plain or notched washers.

The bracket 10 is welded onto the back plate 2 as shown at 8. The U-bolts 4 are shown here with a rubber sheath 6, so as to prevent scuffing to the handlebar of the user's scooter. The U-bolts are threaded at the ends 7, to enable their being screwed on to the back plate 2 by means of the dome nuts 3 and the protective washers 5. Any other suitable nut arrangement could be used, for example wing nuts or cross-head screws. Any other suitable washer arrangement could be used, with any number and combination of plain or notched washers.

Figure 6:
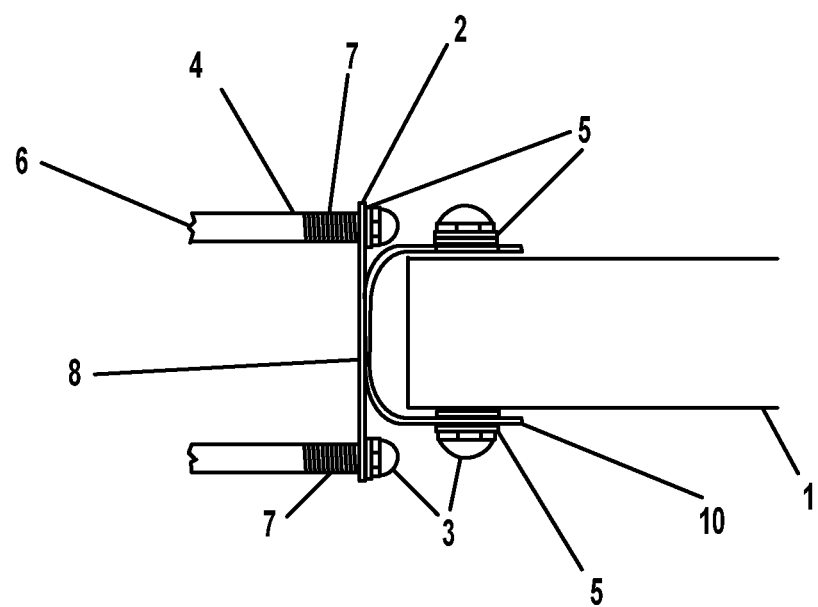
FIG. 6 shows a detailed elevation of a first alternative embodiment.

The core functioning of the first alternative embodiment is further illustrated in the detailed elevation of FIG. 6. It can be seen that the handle 1 is attached to the bracket 10 by means of the dome nut 3 and protective washers 5. Any other suitable nut arrangement could be used, for example wing nuts or cross-head screws. Any other suitable washer arrangement could be used, with any number and combination of plain or notched washers.

The bracket 10 is welded onto the back plate 2 as shown at 8. The U-bolts 4 are shown here with a rubber sheath 6, so as to prevent scuffing to the handlebar of the user's scooter. The U-bolts are threaded at the ends 7, to enable their being screwed on to the back plate 2 by mean of the dome nuts 3 and the protective washers 5. Any other suitable nut arrangement could be used, for example wing nuts or cross-head screws. Any other suitable washer arrangement could be used, with any number and combination of plain or notched washers.

Figure 7:
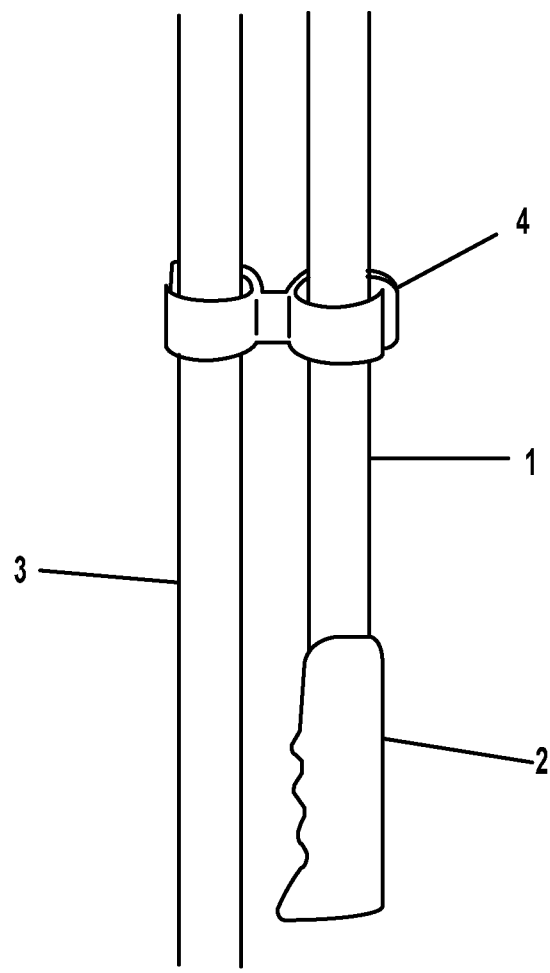
FIG. 7 shows the handle lowered when not in use and attached to the vertical part of the scooter by means of a stowing clip.

FIG. 7 shows the handle 1 and ergonomically-shaped finial 2 lowered when not in use and attached to the vertical part of the scooter 3 by means of a stowing clip 4. Any other suitable double-ended clip could be used.

Figure 8:
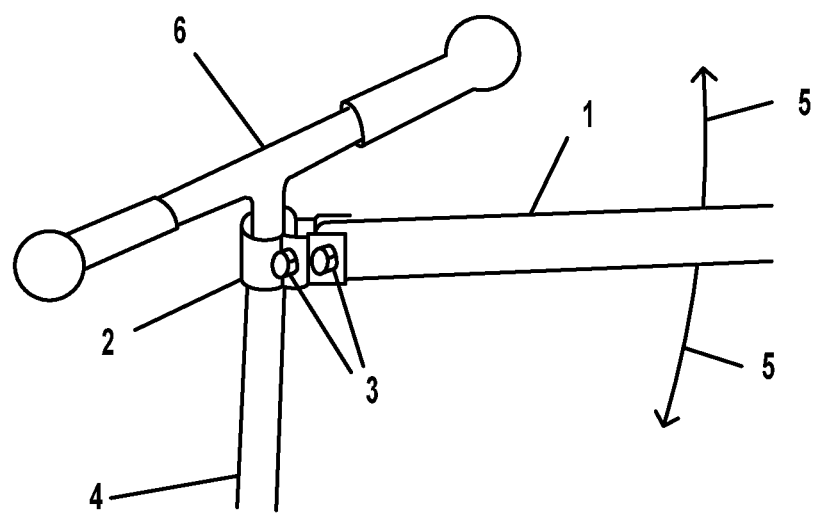
FIG. 8 shows the handle in a second alternative embodiment, attached to the scooter by means of a bracket.
Figure 9:
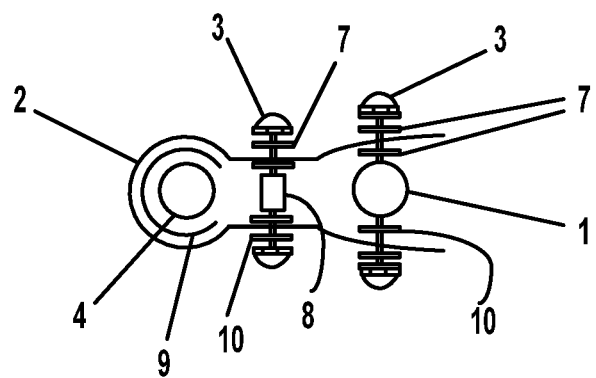
FIG. 9 shows a detailed elevation of the second alternative embodiment.

FIG. 8 shows the handle in a second alternative embodiment. It shows the handle 1 being attached to the scooter 6 by means of a bracket 2. The bracket is fitted to the vertical shaft of the scooter 4. The bracket is fastened to the handle using dome nuts 3. Any other suitable nut arrangement could be used, for example wing nuts or cross-head screws. The handle has a vertical field of motion enabling it to be raised for towing and subsequently lowered when not in use, as indicated by the arrows 5.

This second alternative embodiment is shown in a detailed elevation in FIG. 8. The bracket 2 wraps around the vertical shaft of the scooter 4 and is cushioned with a protective rubber strip 9, which prevents any scuffing to the user's scooter. The central section of the bracket comprises the dome nuts 3, protective washers 7, a spacer 8 and bolt 10. Any other suitable nut arrangement could be used, for example wing nuts or cross-head screws. Any other suitable washer arrangement could be used, with any number and combination of plain or notched washers. The bracket attaches to the handle 1 by means of dome nuts 3, protective washers 7 and bolt 10. Any other suitable nut arrangement could be used, for example wing nuts or cross-head screws. Any other suitable washer arrangement could be used, with any number and combination of plain or notched washers.

Figure 10:
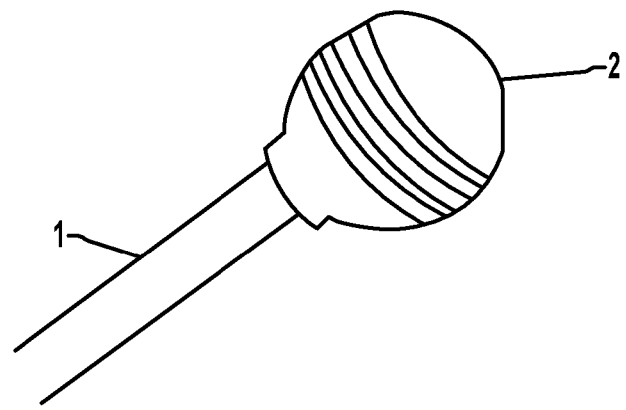
FIG. 10 shows an alternative 'joystick' style finial for the handle.
Figure 11:
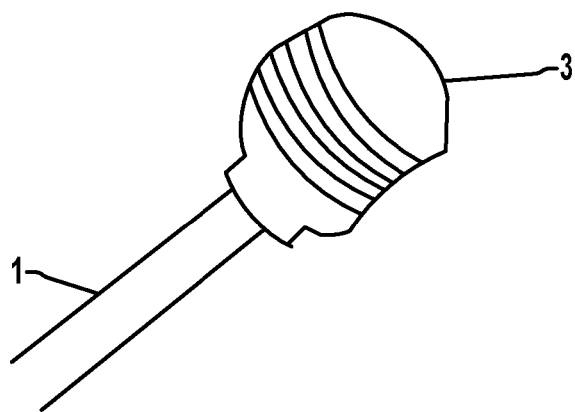
FIG. 11 shows the alternative 'joystick' style finial with additional side cut-out to allow the handle to be stowed flush to the vertical part of the scooter when not in use.
Figure 12:
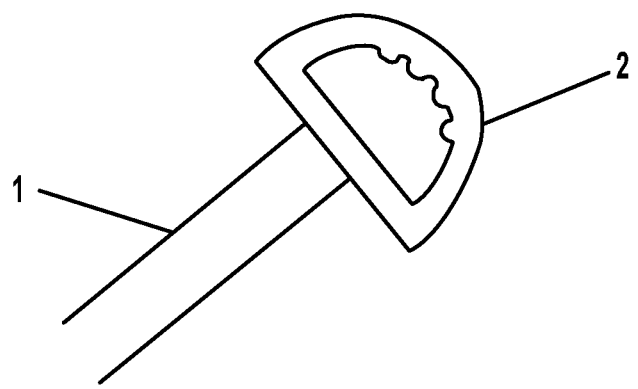
FIG. 12 shows an alternative 'spade' style finial for the handle.

The remaining drawings illustrate alternative finials for the handle. FIG. 10 shows a 'joystick' style finial 2 for the handle 1. FIG. 11 shows the alternative 'joystick' style finial 3 with additional side cut-out to allow the handle 1 to be stowed flush to the vertical part of the scooter when not in use. FIG. 12 shows an alternative 'spade' style finial for the handle. Any other suitable finial and handle arrangement could be used.

The invention claimed is:

1. A towing handle for a children's mechanical wheeled device comprising two ends with an elongated portion arranged therebetween, a first end comprising vehicle attachment means for attaching to a children's vehicle and the second end comprising gripping means for gripping the towing handle by a user in order to pull the children's vehicle along, wherein the vehicle attachment means comprises first and second clam shaped parts, which fix securely together around a part of the wheeled device, and in which the handle is pivotally connected to the first clam shaped part;

wherein at least one of the first and second clam shaped parts comprises mutually generally orthogonally arranged receiving means which receive and fix securely around corresponding orthogonal parts of both a steering column and a steering bar of the wheeled device.

2. A towing handle according to claim 1, wherein at least one of the first and second clam shaped parts is formed from polymeric material.

3. A towing handle according to claim 1, wherein the first clam shaped part comprises a metal insert comprising at least one hole which receives a pivot bolt.

4. A towing handle according to claim 1, wherein the elongated portion is rigid and fixedly attached to a steering portion of the children's vehicle so that lateral movement of the towing handle enables the user to steer the vehicle.

5. A towing handle according to claim 1, wherein the vehicle attachment means comprises a bracket and a back plate connected together by at least one attachment bolt.

6. A towing handle according to claim 1, wherein the handle is removably detained in the folded position.

7. A towing handle according to claim 4, wherein the first clam shaped part is formed as a set of jaws each jaw being provided with at least one hole with a pivot bolt arranged therebetween.

8. A towing handle according to claim 2, wherein the elongated portion is telescopic.

9. A towing handle according to claim 1, wherein the elongated portion is flexible.

10. A towing handle according to claim 2, wherein the elongated portion is pivotally connected to the first attachment means in the vertical direction.

11. A towing handle according to claim 7, wherein the elongated portion is pivotally connected to the pivot bolt.

12. A towing handle according to claim 4, wherein the towing handle is foldable to a fully pivoted position parallel to a frame member of the vehicle for storage when not in use.

13. A towing handle according to claim 12, wherein the towing handle is provided with additional attachment means for attaching to a corresponding frame part the vehicle when the towing handle is in a fully folded pivoted position.

14. A children's scooter comprising:
front and rear wheels and a foot platform arranged therebetween;
an upright support structure with a handle arranged at its upper end; and
a towing handle attached to an upper part of the upright support structure, the towing handle comprising first and second ends with an elongated portion arranged therebetween, the first end comprising vehicle attachment means with first and second clam shaped parts, which fix securely together around a part of the upright support structure, and in which the towing handle is pivotally connected to the first clam shaped part, the second end comprising gripping means for gripping the towing handle by a user in order to pull the children's scooter along:
wherein at least one of the first and second clam shaped parts comprises mutually generally orthogonally arranged receiving means which receive and fix securely around corresponding orthogonal parts of both a steering column and a steering bar of the children's scooter.

15. A children's scooter according to claim 14, wherein the towing handle is pivotally attached to the upright support structure.

16. A children's scooter comprising a towing handle according to claim 1.

17. A towing handle for a children's mechanical wheeled device comprising two ends with an elongated portion arranged therebetween, a first end comprising vehicle attachment means for attaching to a children's vehicle and the second end comprising gripping means for gripping the towing handle by a user in order to pull the children's vehicle along, wherein the vehicle attachment means comprises first and second clam shaped parts, which fix securely together around a part of the wheeled device, and in which the handle is pivotally connected to the first clam shaped part;
wherein the elongated portion is rigid and fixedly attached to a steering portion of the children's vehicle so that lateral movement of the towing handle enables the user to steer the vehicle; and
wherein the towing handle is foldable to a fully pivoted position parallel to a frame member of the vehicle for storage when not in use.

18. A towing handle according to claim 17, comprising additional attachment means for attaching to a corresponding frame part the vehicle when the towing handle is in a fully folded pivoted position.

* * * * *